United States Patent [19]

Mazzorana et al.

[11] Patent Number: 4,600,850

[45] Date of Patent: Jul. 15, 1986

[54] BRUSH-HOLDER FOR DISC COMMUTATOR OF ROTATING ELECTRIC MACHINES

[75] Inventors: Alfred B. Mazzorana, Venissieux; Francis Froment, Lyons, both of France

[73] Assignee: Societe Paris-Rhone, Lyons, France

[21] Appl. No.: 664,725

[22] Filed: Oct. 25, 1984

[30] Foreign Application Priority Data

Nov. 4, 1983 [FR] France ................................ 83 17766

[51] Int. Cl.[4] .............................................. H02K 13/00

[52] U.S. Cl. .................................... 310/242; 310/237; 310/246; 310/247

[58] Field of Search ............... 310/237, 239, 240, 241, 310/242, 244, 245, 246, 247, 248, 249, 238

[56] References Cited

U.S. PATENT DOCUMENTS

| | | | |
|---|---|---|---|
| 1,802,957 | 4/1931 | Ragsdale | 310/244 |
| 4,155,023 | 5/1979 | Hagenlocher | 310/246 |
| 4,340,832 | 7/1982 | Cheetham | 310/239 |

FOREIGN PATENT DOCUMENTS

| | | | |
|---|---|---|---|
| 0812090 | 7/1949 | Fed. Rep. of Germany | 310/246 |
| 2435839 | 5/1980 | France | 310/239 |
| 0210516 | 1/1967 | Sweden | 310/239 |
| 1064955 | 4/1967 | United Kingdom | 310/239 R X |
| 0743088 | 6/1980 | U.S.S.R. | 310/237 |

*Primary Examiner*—R. Skudy

*Attorney, Agent, or Firm*—Dowell & Dowell

[57] ABSTRACT

A brush-holder for the disc commutator of rotating electric machines, in which axially-disposed brushes are maintained in abutment against the disc commutator by a spring constituted by two windings housed in a cavity located in the brush-holder opposite the brush guides. The two windings are separated by a median loop which engages elastically behind a retaining catch. The invention is particularly applicable to electric starters for internal combustion engines.

7 Claims, 4 Drawing Figures

BRUSH-HOLDER FOR DISC COMMUTATOR OF ROTATING ELECTRIC MACHINES

The present invention relates to improvements in or relating to brush-holders for the disc commutator of a rotating machine such as a starter motor for internal combustion engine.

In electric machines of this type, the brushes are known to be oriented axially, i.e. parallel to the longitudinal axis of the machine. Under these conditions, the length of the coil springs adapted to apply the brushes elastically against the commutator increases the dimensions of the electric motor. In addition, assembly is complex as the end of the springs opposite the brushes must come into contact with a bearing surface provided on a cowling of the brush-holder. Finally, due to the direct contact of the active part of the springs with the brushes, the active parts of the springs are heated up, which is detrimental to long life.

In order to overcome these drawbacks, British Pat. No. 1 064 955 for example has already proposed providing the brush-holders with hooks on which are supported the turns of a torsion spring of which one of the legs abuts against the free end of each brush, whilst the other end of the spring is engaged in a depression provided in this end. According to this solution, there are as many springs as there are brushes. Assembly of each spring is difficult as its winding must be threaded longitudinally in the hook, making sure that the legs of the spring do not catch on any obstacle. This type of assembly is virtually impossible to render automatic, for example during assembly by a robot.

The improvements forming the subject matter of the present invention aim at overcoming the drawbacks mentioned above and at producing a brush-holder comprising a single spring for supporting the brushes against the commutator, the assembly of this spring being particularly simple so that it may be rendered automatic. Moreover, the length of the legs of the spring allows good dissipation of the heat which is transmitted thereto by the brushes, with the result that the active elements of the spring, namely its two windings, do not undergo any heating likely to reduce their elastic qualities.

To this end, the brushes are maintained in abutment against the commutator by means of a single spring constituted by two aligned windings housed in a cavity in the brush-holder located opposite the guides of the brushes, said windings being separated by a central loop retaining the spring with respect to the brush-holder.

The invention will be more readily understood on reading the following description with reference to the accompanying drawings, in which.

Figure 1:
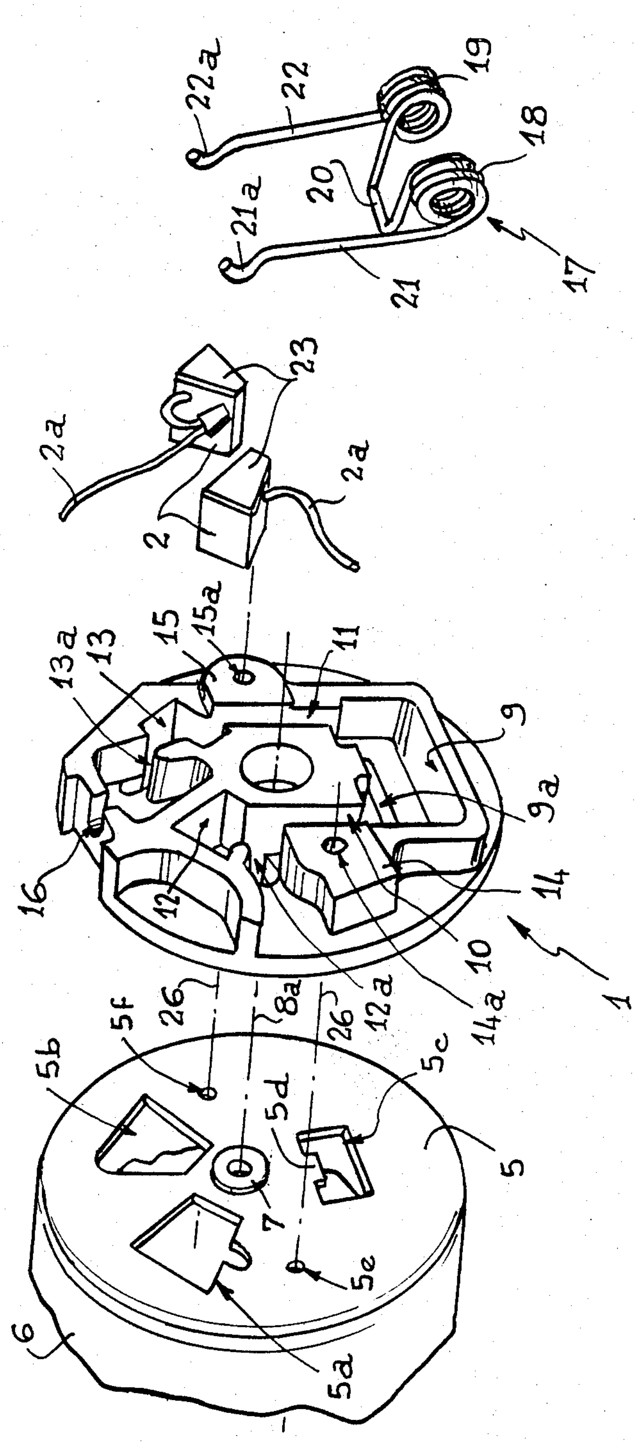
FIG. 1 is an exploded view showing a brush-holder according to the invention adapted to be associated with the dished body of an electric motor and in which is shown the spring for supporting the brushes.

Referring now to the drawings, FIG. 1 illustrates a brush-holder according to the invention made of an insulating material such as a moulded plastics material and which is generally referenced 1. This holder is adapted to allow the elastic application of two brushes

Figure 2:
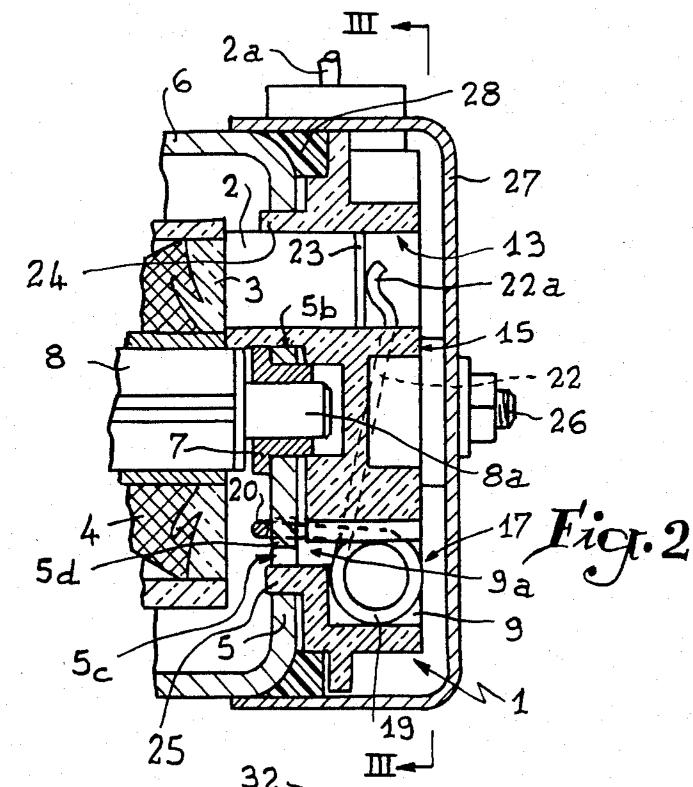
FIG. 2 is a partial longitudinal section through an electric motor including a brush-holder according to the invention.
Figure 3:
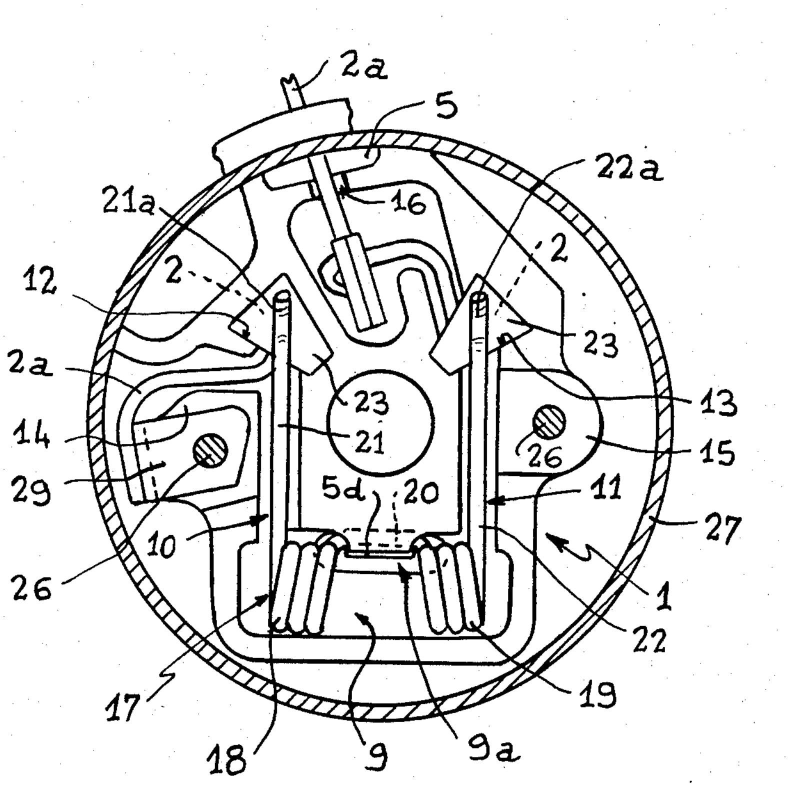
FIG. 3 is a section thereof along III—III (FIG. 2).

2, FIG. 3, on the face of a commutator disc 3 (FIG. 2) associated with the armature 4 of an electric motor. The body of the motor is preferably dished so that its end associated with the brush-holder 1 is in the form of the bottom 5 of a hollow cylindrical body 6. The bottom 5 is provided with a central bearing 7 in which swivels the end **8*a* of the shaft 8 of the armature 4**.

The brush-holder 1 is in the general form of a disc, FIG. 1, comprising reinforcing ribs which firstly form a U-shaped notch whose transverse part constitutes a cavity 9, extened by two rectilinear grooves 10, 11 forming the arms of the U in question, and which open out into axial guides 12, 13 receiving the brushes 2. The brush-holder 1 further comprises two bosses 14, 15 of which one face joins the edge of each groove 10, 11 and which are each provided with a central hole **14*a*, 15*a* whose role will be more clearly explained hereinafter. It will be observed that the guides 12, 13 include lateral openings 12*a*, 13*a* in which are housed the supply leads 2*a* of the brushes 2. One of the leads further passes through a notch 16** made in one of the peripheral ribs of the brush-holder.

To apply the two brushes 2 against the commutator 3, a single spring 17 is used, composed of two aligned windings 18, 19 connected by a central loop 20 extending offset therefrom, the opposite ends of the two windings terminating in a rectilinear leg 21, 22. It will be observed that the ends of the legs 21, 22 are slightly curved so as to abut on the brushes at a rounded part **21*a*, 22*a*. In fact, these parts do not bear directly on the brushes, but on a plate 23 provided to be electrically insulating so that the brushes are not short-circuited by the spring 17**.

The two windings of the latter are housed in the cavity 9, whilst its legs 21, 22 pass through the grooves 10 and 11 to abut against the plates 23, as illustrated in FIG. 3.

The bottom 5 of the body 6 includes two openings **5*a*, 5*b* through which tubular extensions 24, 25 of the raised edges of the guides 12 and 13 of the brush-holder pass in order to centre it with respect to the bottom 5 and to insulate it electrically with respect to the brushes. The bottom 5 further includes a notch 5*c* presenting a tab 5*d* disposed opposite and inside an opening or passage 9*a* made in the bottom of the cavity 9. In this way, the central U-shaped loop 20 of the spring 17 passes through said opening to engage behind the tab 5*d* so as initially to retain the spring and then to effect a pre-assembly of the brush-holder with respect to the bottom 5. At a second stage, bolts 26 illustrated in broken lines in FIG. 1 are engaged in the holes 14*a*, 15*a* of the bosses 14, 15 of the brush-holder 1 and in corresponding holes 5*e*, 5*f* in the bottom 5 of the body 6 to ensure final assembly on said bottom of the brush-holder and of a cover 27 adapted to protect the brush-holder and which is sealed by an O-ring 28**.

FIG. 3 shows a lug 29 associated with the end of one of the leads **2*a* so that one of the two brushes is earthed via the corresponding fixing bolt 26, whilst the other lead emerges outside the cover 27 via the notch 16**.

The plates 23 adapted to insulate the legs 21, 22 of the springs with respect to the brushes 2 may be replaced by a coating applied on the outer face of the brushes, the presence of added pieces then being dispensed with.

Figure 4:
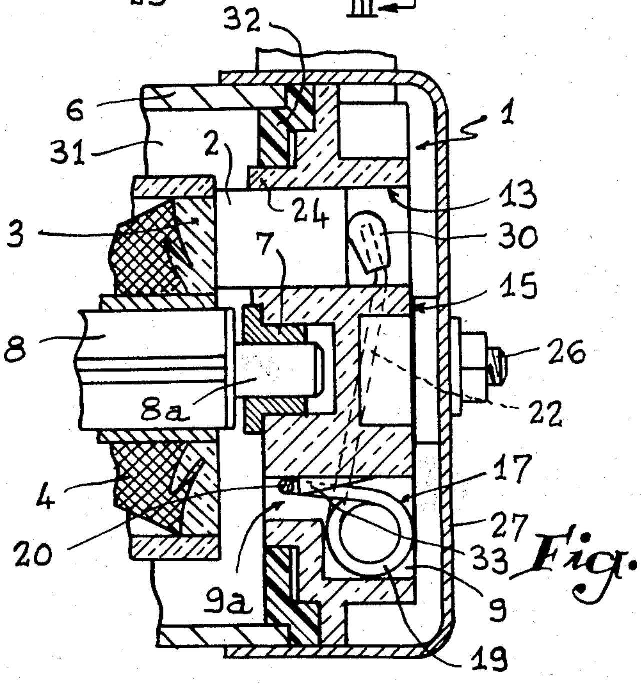
FIG. 4 is a view similar to that of FIG. 2, but illustrating a modified assembly.

In the embodiment of FIG. 4, electrical insulating end pieces 30 are moulded over the curved ends **21*a*, 22*a* of the legs 21, 22 so that these latter can bear directly on the brushes whose outer faces in that case include no insulating means. These end pieces may, of course, also be clipped on the curved ends 21***a*, 22*a*.

In the embodiment of FIG. 4, the body of the electric motor is made in the conventional form of a tubular sleeve 31, so that the brush-holder 1 closes the end of said body via a seal 32. Under these conditions, the central loop 20 of the spring 17 passes behind a catch 33 made in the passage 9*a* so that the spring is fastened to the brush-holder in question and assembles the latter to the body at least temporarily.

It must, moreover, be understood that the foregoing description has been given only by way of example and that it in no way limits the domain of the invention which would not be exceeded by replacing the details of execution described by any other equivalents. In particular, the brush-holder may be provided to be metallic, on condition that at least the guides 12, 13 are provided with an insulating coating. It may also be completely insulated by an appropriate layer of insulating material.

What is claimed is:

1. A brush and holder assembly for a rotating electric machine having a commutator disc disposed normal to an axis of a shaft of its armature, and the machine having a body with an end surrounding the armature and commutator disc, the brush and holder assembly comprising:

(a) a brush holder shaped to fit the end of the body and having axial brush guides extending toward the commutator disc, and the holder having a cavity;

(b) a brush in each of said guides, each of said brushes having an inner end contacting the commutator disc and having an outer end;

(c) a single spring for pressing of said brushes toward the commutator disc, the spring having two windings shaped to fit and be housed in the cavity, adjacent ends of the windings being mutually joined together by a central loop extending offset from the windings, and the spring having two legs extending respectively from other ends of the windings and each of said legs having an end extending to and overlying the outer end of each of brushes;

(d) insulating means between ends of the legs and the outer end of each of the brushes; and (e) retaining catch means adjacent to the cavity and operative to receive and retain the loop, the loop and said retaining catch means being positioned with respect to said cavity to urge the ends of the legs of the spring toward the outer ends of the brushes.

2. In a brush and holder assembly as claimed in claim 1, said insulating means comprising an electrically insulating plate inserted between the outer end of each of said brushes and the ends of the legs of the spring.

3. In a brush and holder assembly as claimed in claim 1, said insulating means comprising an electrically insulating coating on the outer end of each of said brushes on which ends of the legs of the spring lie.

4. In a brush and holder assembly as claimed in claim 1, said insulating means comprising an electrically insulating end piece covering said end of each of the legs of the spring and lying against the outer ends of the brushes.

5. In a brush and holder assembly as claimed in claim 1, wherein the brush holder cavity is U-shaped and further includes two grooves extending from it to said brush guides, the spring windings and said loop being received in said cavity and the legs of the spring being received in said grooves and extending through them into said brush guides.

6. In a brush and holder assembly as claimed in claim 1, wherein the body of the machine has a bottom supporting the brush holder on the machine, and the cavity lying opposite and aligning with a notch in the bottom, the notch having a tab to retain the spring in the cavity.

7. In a brush and holder assembly as claimed in claim 1, wherein said retaining catch means extending into the cavity.

* * * * *